United States Patent [19]

Martin

[11] 4,400,303
[45] Aug. 23, 1983

[54] CATALYST FOR OLEFIN POLYMERIZATION

[75] Inventor: Joel L. Martin, Bartlesville, Okla.

[73] Assignee: Phillips Petroleum Company, Bartlesville, Okla.

[21] Appl. No.: 241,975

[22] Filed: Mar. 9, 1981

[51] Int. Cl.³ ............................................. C08F 4/64
[52] U.S. Cl. ................................. 252/429 B; 526/125
[58] Field of Search .................................... 252/429 B

[56] References Cited

U.S. PATENT DOCUMENTS

| | | | |
|---|---|---|---|
| 3,549,717 | 12/1970 | Itakura et al. | 252/429 B X |
| 3,642,746 | 2/1972 | Kashiwa et al. | 252/429 B X |
| 4,013,823 | 3/1977 | Longi et al. | 526/166 |
| 4,143,223 | 3/1979 | Toyota et al. | 252/429 B X |
| 4,220,745 | 9/1980 | Tanaka et al. | 252/429 B X |
| 4,258,168 | 3/1981 | Karayannis et al. | 252/429 B X |

FOREIGN PATENT DOCUMENTS 855707  12/1977  Belgium .

*Primary Examiner*—Patrick Garvin

[57] ABSTRACT

A process for polymerizing ethylene using a catalyst component prepared by pretreating a magnesium dihalide with selected organic oxy compounds and then reacting the pretreated magnesium dihalide with a halogenated titanium compound.

14 Claims, No Drawings

CATALYST FOR OLEFIN POLYMERIZATION

This invention relates to a process for producing polymers of ethylene and a catalyst suitable for use in the process.

BACKGROUND

Olefin polymerization catalysts which consist of transition metal halogen compounds and organometallic compounds are generally known. It is also known that the activity of the catalyst is generally improved if the transition metal halogen compound is supported on a carrier. Since the presence of large amounts of carrier can have an adverse effect upon the properties of the resulting polymer, it is obviously desirable to have catalysts with activity levels high enough that the presence of the carrier in the polymer will not pose any significant problem.

U.S. Pat. No. 3,642,746 discloses that improved supported catalysts of that type can be obtained by pretreating a carrier, such as a magnesium dihalide with certain electron donors and then combining the pretreated carrier with the transition metal halogen compound.

The present invention is directed to a new alternative process for improving the productivity of magnesium dihalide-supported ethylene polymerization catalysts.

SUMMARY OF THE INVENTION

In accordance with the present invention, a highly active ethylene polymerization catalyst is obtained by (1) pretreating solid particles of magnesium dihalide by copulverizing said particles in the presence of certain organic oxy compounds, and then (2) reacting the pretreated solid particles with a halogenated titanium compound.

The magnesium dihalide used as the carrier is insoluble or sparingly soluble in the solvents or diluents generally used in the polymerization reaction. The magnesium dihalides are preferably a chloride, bromide, or iodide. Such magnesium dihalides are used in the form of anhydride commercially available, or when they contain water of crystallation, they may be used after heating in a stream of a halogen corresponding to that of the dihalide. Magnesium dichloride is currently most preferred.

The oxy compounds used to pretreat the magnesium dihalide are those of the general formula

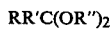

wherein R is selected from hydrogen, alkyl radicals having 1 to 4 carbon atoms, and halogenated alkyl radicals having 1 to 4 carbon atoms; wherein R' is selected from hydrogen, alkyl radicals containing 1 to 4 carbon atoms, halogenated alkyl radicals containing 1 to 4 carbon atoms, and OR''; wherein each R'' is individually selected from alkyl radicals having 1 to 4 carbon atoms. Such compounds are often referred to as acetals, ketals, and ortho esters.

Specific examples of such oxy compounds include trimethoxymethane; triethoxymethane; triisopropoxymethane; tri-n-butoxymethane; 1,1,1-trimethoxyethane; 1,1,1-trimethoxypropane; 1,1,1-triethoxybutane; 1,1,1-tri-n-butoxyn-pentane; 1,1,-diethoxy-2-chloroethane; 1,1-diethoxyethane; dimethoxymethane; 1,1-dimethoxyethane; diethoxymethane; 1,1-di-n-butoxyethane; di-n-butoxymethane; 2,2-diethoxypropane; 3,3-dipropoxy-n-pentane; and 2,2-dimethoxypropane. Because of the large improvement in activity obtained therewith the ortho esters are currently the preferred oxy compounds.

The mechanical copulverization is carried out using a ball mill, a vibratory mill, or impact mill or the like preferably in the substantial absence of oxygen or water.

The "mechanical copulverization", as used in this application, denotes pulverization which imparts a violent pulverizing effect to a material, and excludes such means as mere mechanical stirring. The milling operation is carried out at a temperature, pressure, and time sufficient to thoroughly mix the components and form an activated intermediate composition. Generally, a temperature ranging from about 0° to about 100° C., preferably from about 25° to about 75° C. is suitable, with more active catalysts produced at the higher temperatures. Normally, milling is carried out at atmospheric pressure although pressures ranging from about 0.1 to about 10 atmospheres can be employed, if desired. The length of milling is dependent to some extent on the temperatures and pressures involved, the higher temperatures requiring shorter milling times, for example. At atmospheric pressure and temperatures ranging from about 30° to about 60° C., milling times ranging from about 5 to about 24 hours are generally adequate when vibratory ball milling is employed. Ball milling employing rotating rolls is generally not as intense as vibratory ball milling hence milling times ranging up to about 100 hours or more can often be utilized. The optimum milling conditions can be readily determined by routine experimentation.

The mole ratio of magnesium halide to the ortho ester or acetal or ketal can vary from about 0.5:1 to about 100:1, preferably from about 1:1 to about 50:1. Preferably, the level of oxy compound is kept below that which would cause undue agglomeration of the dihalide particles during the milling. For an ortho ester such as triethoxymethane (i.e., triethylorthoformate) this generally involves using no more than about 2 to 4 milliliters of the oxy compound for each 10 grams of magnesium dihalide.

The halogenated titanium compounds used in preparing the present catalyst are those having the formula

wherein R''' is a hydrocarbyl radical containing 1 to 12 carbon atoms, X is a halogen, usually bromine, chlorine, or iodine, and n is an integer of 1 to 4.

Examples of specific halogenated titanium compounds include titanium tetrachloride, titanium tetrabromide, titanium tetraiodide, titanium bromotrichloride, titanium dichlorodiethoxide, titanium trichlorophenoxide, titanium bromo-tri-dodecyloxide, titanium dichlorodicyclohexyloxide, and mixtures thereof. A preferred subgroup of compounds is the titanium tetrahalides. Of these, titanium tetrachloride is presently preferred because of its ready availability and particular efficacy in the production of active catalysts.

The pretreated particles resulting from the pulverization are then reacted with the titanium compound in the absence of any substantial pulverization. The term "in the absence of any substantial pulverization", as used herein means that the violent copulverization used in forming the pretreated magnesium dihalide particles is absent, but such an operation as mere stirring is permissible.

If a liquid, the halogenated titanium compound can be used neat. However, it is often more convenient to employ it dissolved in a dry solvent such as n-heptane to insure more effective contact in the treating process.

The reaction of the pretreated particles and the titanium halide may conveniently be effected by suspending the pretreated particles in the titanium halide or in its solution in an inert solvent at temperatures in the range of about 0° C. to about 135° C. and then separating the solid materials, followed by drying or removing free titanium halides by washing with an inert solvent to obtain the activated titanium catalyst component. The term inert solvent is used herein to denote any solvents that do not adversely affect the catalyst component. Typical examples include aliphatic, alicyclic, and aromatic hydrocarbons and mixtures thereof.

Generally, it has been found that best results are obtained if the reaction between the pretreated particles and the titanium halide is conducted at lower temperatures, temperatures in the range of 20° C. to 80° C. being preferred, with best results occurring at the lower end of that temperature range, i.e., between 20° C. and 30° C.

While excess titanium halide can be employed, generally the molar ratio of titanium halide to the magnesium dihalide used in the pretreating step is in the range of about 10/1 to about 0.005/1, more generally from about 5/1 to about 0.1/1.

The inventive titanium-containing catalyst compound can be used in the polymerization of monomers comprising ethylene. The ethylene can be homopolymerized or copolymerized with other suitable monomers. Examples of other typical monomers polymerized in combination with ethylene are aliphatic mono-1-olefins having 3 to 10 carbon atoms per molecule and conjugated and non-conjugated dienes such as butadiene, 5-ethylidene-2-norbornene, 1,7-octadiene, vinyl cyclohexene, 1,4-hexadiene, and dicyclopentadiene. The invention is particularly suited for the preparation of ethylene homopolymers and copolymers which contain at least 90 mole percent, and preferably 95 mole percent of ethylene.

For polymerizing ethylene the inventive catalyst component is used in combination with a cocatalyst comprising an organometallic compound of a metal of Groups I, IIA, and IIIA of the Periodic Table. Generally, however, it is presently preferred that an organoaluminum compound is used as the cocatalyst. The organoaluminum compounds can be expressed as $AlR''''_b Y_{3-b}$ in which $R''''$ is a hydrocarbon group selected from alkenyl, alkyl, cycloalkyl, aryl and combinations such as alkaryl and aralkyl, Y is a monovalent radical selected from among the halogens and hydrogen, and b is an integer of 0 to 3.

Examples of specific compounds include trimethylaluminum, triethylaluminum, tridodecylaluminum, tricyclohexylaluminum, triphenylaluminum, tribenzylaluminum, tri-isopropylaluminum, diethylaluminum chloride, ethylaluminum dibromide, n-butylaluminum dichloride, diisobutylaluminum hydride, and the like.

The amount of cocatalyst employed with the catalyst during the polymerization process can vary rather widely from about 0.02 mmole to about 10 mmole per liter of reactor contents. Particularly good results have been obtained in the range from about 0.07 to about 2.5 mmole per liter of reactor contents.

The polymerization can be effected batchwise or continuously by employing any conventional mode of contact between the catalyst system and the monomers. For example, a monomer can be polymerized by contact with the catalyst system in solution, in suspension, or in gaseous phase at temperatures ranging from about 20° to 200° C. and pressure ranging from about atmospheric to about 1000 psia (6.9 MPa). The polymerization can be conducted batchwise such as in a stirred reactor or continuously such as in a loop reactor under turbulent flow conditions sufficient to maintain the catalyst in suspension.

It is especially convenient when producing ethylene polymers to conduct the polymerization in the presence of a dry hydrocarbon diluent inert in the process such as isobutane, n-heptane, methylcyclohexane, benzene, and the like at a reactor temperature ranging from about 60° to about 110° C. and a reactor pressure ranging from about 250 to about 650 psia (1.7–4.6 MPa). In such a process, particle form polymerization, the polymer is produced as discrete solid particles suspended in the reaction medium. The produced polymer can be recovered, can be treated to deactivate and/or remove catalyst residues, can be stabilized with an antioxidant system, and can be dried, all as known in the art, to obtain the final product. Also, molecular weight control agents such as hydrogen can be employed in the reactor as is known in the art to adjust the molecular weight of the polymer, if desired.

A further understanding of the present invention and its advantages will be provided by the following examples.

EXAMPLE I

Catalyst Preparation and Ethylene Polymerization

A series of catalysts was prepared by individually ball milling a suitable quantity of magnesium chloride with a suitable quantity of a specified ortho ester, acetal, or ketal, neat, for about 16 hours at ambient conditions under an argon atmosphere. All ball milling was performed in a 250 mL sperical steel vessel containing about 400 g of 3/8 inch (0.95 cm) diameter steel balls. The maximum milling temperature reached in this operation was no higher than about 60° C. The milling machine used was a Vibratom Model 6L-B made by Siebtechnik GMBH of West Germany which operates at a frequency of 1760 cycles per minute with an amplitude of about 0.95 cm.

Two grams of each recovered product, designated catalyst A for convenience, was treated with 1 or 2 mL of TiCl$_4$ in n-hexane (5 or 10 mL n-hexane) at 23° for 1 hour. Each resulting solid product was filtered, washed with n-hexane, and dried under argon to produce the final product, designated catalyst B for convenience.

Ethylene polymerization was carried out in a stirred, one gallon (3.8 L), stainless steel reactor. The reactor was conditioned for each polymerization run by charging it with about 3 liters of dry n-heptane, closing the port, and heating reactor and contents to 175° C. for 30 minutes. The contents were then drained, purged with nitrogen, cooled to room temperature (23° C.) under nitrogen, and flushed with isobutane vapors. Each polymerization run was carried out by charging the reactor in order with 3 mmoles of the cocatalyst, as a 15 weight percent solution of triethylaluminum in n-heptane, the catalyst, and 1.2 L of dry isobutane. The reactor and contents were then heated to the desired reaction temperature (80° C. or 100° C.), and hydrogen, if used, and ethylene added. Ethylene was added on demand during the run to maintain the desired pressure.

Each run was terminated by venting the volatiles from the reactor. The polymer was then recovered, dried, and weighed to determine the yield expressed as grams.

Catalyst productivity is expressed in terms of kg polymer per g catalyst per hour, "catalyst" referring to the titanium-containing component of the catalyst system. It is calculated by dividing polymer yield in kilograms by the weight of catalyst in grams by the time in hours.

Melt index (MI) and the high load melt index (HLMI) are determined in accordance with ASTM D 1238-65, Condition for MI and Condition F for HLMI. The ratio HLMI/MI is believed to be related to molecular weight distribution of the polymer. The values obtained in this example as well as subsequent examples, ranging from about 25 to 27, are characteristic of those obtained with titanium catalyst-metal alkyl cocatalyst systems and are considered to be representative of fairly narrow molecular weight distribution ethylene polymers.

The quantities of the various components employed and results obtained are given in Tables I and II.

The polymerization results given in Table II show that the present invention provides high productivity catalysts. The catalysts made in the presence of ortho esters (runs 1–4) generally yield much more active catalysts than catalysts made in the presence of acetals or ketals (runs 5–8). Thus, an ortho ester, particularly triethylorthoformate, is preferred in producing the most active catalysts. An acetal outside of the scope of the invention in contrast yielded a dead catalyst (runs 8, 8B).

EXAMPLE II

Catalyst Preparation and Ethylene Polymerization

A series of catalysts was prepared by individually ball milling 10 g samples of magnesium chloride with a specified quantity of various ethyl esters of organic acids, neat, for about 16 hours as described in Example I. Each recovered product was treated with $TiCl_4$, isolated, washed, dried and portions thereof used to polymerize ethylene in the manner described in Example I.

The details of catalyst preparation are given in Table III and polymerization results are given in Table IV.

TABLE I

Catalyst Preparation, Servers

| Run No. | $MgCl_2$ g | Catalyst A Ester, Acetal or Ketal Name | g | Mole Ratio $MgCl_2$/Org.(a) | Catalyst A $MgCl_2$ g(b) | Catalyst B Hexane mL | $TiCl_4$ g | Mole Ratio $MgCl_2$ $TiCl_4$ |
|---|---|---|---|---|---|---|---|---|
| 1 | 15 | triethylorthoformate | 2.68 | 8.7 | 2.00 | 1.70 | 5 | 3.45 | 0.98 |
| 2 | 10 | triethylorthopropionate | 1.77 | 10 | 2.00 | 1.70 | 5 | 1.73 | 2.0 |
| 3 | 10 | triethylorthoacetate | 1.77 | 9.5 | 2.00 | 1.70 | 5 | 1.73 | 2.0 |
| 4 | 10 | trimethylorthoformate | 1.94 | 5.8 | 2.00 | 1.68 | 10 | 1.73 | 1.9 |
| 5 | 10 | chloroacetaldehyde diethyl acetal | 2.05 | 8.1 | 2.00 | 1.66 | 10 | 3.45 | 0.96 |
| 6 | 10 | acetaldehyde diethyl acetal(c) | 1.65 | 7.5 | 2.00 | 1.72 | 10 | 3.45 | 0.99 |
| 7 | 10 | 2,2-dimethoxypropane | 1.69 | 6.6 | 2.00 | 1.71 | 10 | 3.45 | 0.99 |
| 8 | 10 | acetylacetaldehyde dimethyl acetal(d) | 1.99 | 7.0 | 2.00 | 1.67 | 10 | 3.45 | 0.96 |

(a)Org. means ester, acetal, or ketal.
(b)Calculated weight of $MgCl_2$ in 2 g of catalyst A.
(c)1,1-diethoxyethane.
(d)1,1-dimethoxy-3-butanone.

TABLE II

Ethylene Polymerization

| Run No. | Oxy Compound | Cat. B g | Reaction Conditions Temp. °C. | Pressures, MPa $C_2=$(a) | $H_2$ | Total | Polymer g | Cat. Prod. kg/g | MI | HLMI MI |
|---|---|---|---|---|---|---|---|---|---|---|
| 1B | triethylorthoformate | 0.0240 | 80 | 0.69 | 0 | 2.1 | 1217 | 50.7 | —(b) | — |
| 2B | triethylorthopropionate | .0222 | 100 | 1.6 | 0.41(c) | 4.2 | 748 | 33.7 | 5.7 | 29 |
| 3B | triethylorthoacetate | .0223 | 100 | 1.6 | 0.41(c) | 4.0 | 532 | 23.8 | 3.0 | 27 |
| 4B | trimethylorthoformate | .0194 | 80 | 0.69 | 0 | 2.1 | 325 | 16.7 | — | — |
| 5B | chloroacetaldehyde diethyl acetal | .0112 | 80 | 0.69 | 0 | 2.1 | 73 | 6.52 | — | — |
| 6B | acetaldehyde diethyl acetal | .0182 | 80 | 0.69 | 0 | 2.1 | 47 | 2.04 | — | — |
| 7B | 2,2-dimethoxypropane | .0274 | 80 | 0.69 | 0 | 2.1 | 32 | 1.76 | — | — |
| 8B | acetylacetaldehyde dimethyl acetal | .0152 | 80 | 0.69 | 0 | 2.1 | 0 | 0 | — | — |

(a)$C_2=$ is ethylene.
(b)A dash signifies not determined or not applicable.
(c)As measured by pressure drop from a 2.35 l vessel at 23° C. This corresponds to about 0.16 MPa partial pressure (23 psi) at 23° C. in the reactor.

TABLE III

Catalyst Preparation, Ethyl Esters Comparison

| Run No. | Catalyst A MgCl₂ g | Catalyst A Ester Name | g | Mole Ratio MgCl₂/ester | Catalyst B Catalyst A g | Catalyst B MgCl₂ g(a) | Catalyst B Hexane mL | Catalyst B TiCl₄ g | Mole Ratio MgCl₂ TiCl₄ |
|---|---|---|---|---|---|---|---|---|---|
| 9  | 10 | triethylorthoformate | 1.79 | 8.7 | 2.00 | 1.70 | 10 | 1.73 | 2.0 |
| 10 | 10 | ethyl formate       | 1.85 | 4.2 | 2.00 | 1.69 | 10 | 1.73 | 2.0 |
| 11 | 10 | ethyl acetate       | 1.80 | 5.2 | 2.00 | 1.69 | 10 | 1.73 | 2.0 |
| 12 | 10 | ethyl benzoate      | 2.09 | 7.5 | 2.00 | 1.65 | 10 | 1.73 | 1.9 |

(a)Calculated weight of MgCl₂ in 2 g of catalyst A.

TABLE IV

Ethylene Polymerization At 100° C.

| Run No. | Ester | Cat. B g | Pressures, MPa Ethylene | Pressures, MPa H₂ | Pressures, MPa Total | Polymer g | Cat. Prod. kg/g | MI | HLMI MI |
|---|---|---|---|---|---|---|---|---|---|
| 9B  | triethylorthoformate | 0.0124 | 1.6 | 0.41 | 4.0 | 728 | 58.7 | 0.43 | 26 |
| 10B | ethyl formate        | .0280  | 1.6 | 0.41 | 4.0 | 464 | 16.6 | 1.4  | 28 |
| 11B | ethyl acetate        | .0182  | 1.6 | 0.41 | 4.0 | 187 | 10.3 | 1.0  | 27 |
| 12B | ethyl benzoate       | .0205  | 1.6 | 0.41 | 4.0 | 452 | 22.0 | 1.4  | 32 |

(a)Runs 10B, 11B, 12B are control runs, run 9B is an invention run.

The polymerization results given in Table IV clearly show that a catalyst made in the presence of triethylorthoformate (runs 9, 9B) is much more active in ethylene polymerization than a catalyst made with about the same weight of ethyl formate (runs, 10, 10B). Catalysts made with ethyl acetate (runs 11, 11B) and ethyl benzoate (12, 12B) were also considerably less active in ethylene polymerization than the invention catalyst of runs 9, and 9B.

EXAMPLE III

Catalyst Preparation and Ethylene Polymerization

A series of catalysts was prepared by individually ball milling 10 g samples of magnesium chloride with different amounts of triethylorthoformate. Ball milling was carried out, samples recovered and treated with TiCl₄ and recovered as described previously. Portions of the catalysts were employed in ethylene polymerization as described in Example I.

The details of catalyst preparation are given in Table V and polymerization results are given in Table VI.

TABLE V

Catalyst Preparation, Ortho Ester Level Comparison

| Run No. | Catalyst A MgCl₂ g | Catalyst A Triethylorthoformate g | Catalyst A mL | Mole Ratio MgCl₂/ester | Catalyst B Catalyst A g | Catalyst B MgCl₂ g(a) | Catalyst B Hexane mL | Catalyst B TiCl₄ g | Mole Ratio MgCl₂ TiCl₄ |
|---|---|---|---|---|---|---|---|---|---|
| 13 | 10 | 0.895 | 1 | 17  | 2.00 | 1.84 | 10 | 3.45 | 1.1  |
| 14 | 10 | 1.79  | 2 | 8.7 | 4.00 | 3.39 | 10 | 6.90 | 0.98 |
| 15 | 10 | 2.68  | 3 | 5.8 | 2.00 | 1.58 | 5  | 3.45 | .91  |
| 16 | 10 | 3.58  | 4 | 4.4 | 2.00 | 1.47 | 5  | 3.45 | .85  |
| 17 | 10 | 4.47  | 5 | 3.5 | 2.00 | 1.38 | 5  | 3.45 | .80  |
| 18 | 10 | 5.37  | 6 | 2.9 | 2.00 | 1.30 | 5  | 3.45 | .75  |

(a)Calculated weight of MgCl₂ in stated weight of catalyst A.

TABLE VI

Ethylene Polymerization At 80° C., No Hydrogen

| Run No. | Cat. B g | Pressures, MPa Ethylene | Pressures, MPa Total | Polymer g | Cat. Prod. kg/g |
|---|---|---|---|---|---|
| 13B | 0.0276 | 0.69 | 2.1 | 903  | 32.7 |
| 14B | .0127  | 0.69 | 2.2 | 581  | 45.7 |
| 15B | .0194  | 0.69 | 2.1 | 1001 | 51.6 |
| 16B | .0223  | 0.69 | 2.1 | 1101 | 49.4 |
| 17B | .0218  | 0.69 | 2.2 | 734  | 33.7 |
| 18B | .0336  | 0.69 | 2.1 | 940  | 28.0 |

The polymerization results given in Table VI show that the amount of triethylorthoformate affects the polymerization activity of the resulting catalysts. As the results of runs 14B to 16B demonstrate, the polymerization activity appears to peak when mole ratios of MgCl₂ to ester vary from about 4 to about 9. Although active catalysts are still made at higher and lower mole ratios polymerization activity is declining.

EXAMPLE IV

Catalyst Preparation and Ethylene Polymerization

A series of catalysts was prepared by individually ball milling 10 g samples of magnesium chloride with a specified amount of triethylorthoformate as described before. Each recovered product was treated with TiCl₄ as generally described previously except that the treating temperature and the amount of TiCl₄ was varied. The treated samples were recovered as described previously and portions thereof used to polymerize ethylene in the manner previously described.

The details of catalyst preparation are given in Table VII and the polymerization results are given in Table VIII.

TABLE VII

Catalyst Preparation, Effect Of TiCl$_4$ Level and Temperature

| | Catalyst A | | | | Catalyst B | | | | |
|---|---|---|---|---|---|---|---|---|---|
| Run No. | MgCl$_2$ g | Triethylorthoformate g | Mole Ratio MgCl$_2$/ester | g | Cat. A MgCl$_2$ g(a) | Hexane mL | g | TiCl$_4$ °C. | Ratio MgCl$_2$ TiCl$_4$ |
| 19 | 10 | 2.68 | 5.8 | 2 | 1.58 | 5 | 3.45 | 23 | 0.91 |
| 20 | 10 | 2.68 | 5.8 | 2 | 1.58 | 10 | 3.45 | 50–60 | 0.91 |
| 21 | 10 | 2.68 | 5.8 | 2 | 1.58 | 10 | 3.45 | 80 | 0.91 |
| 22 | 10 | 1.79 | 8.7 | 2 | 1.70 | 10 | 0.863 | 23 | 3.9 |
| 23 | 10 | 1.79 | 8.7 | 2 | 1.70 | 10 | 3.45 | 23 | 0.98 |

(a)Calculated weight of MgCl$_2$ in 2 g of catalyst A.

TABLE VIII

Ethylene Polymerization At 80° C., No Hydrogen

| Run No. | Cat. B g | Pressures, MPa Ethylene | Total | Polymer g | Catalyst Productivity kg/g |
|---|---|---|---|---|---|
| 19B | 0.0194 | 0.69 | 2.1 | 1001 | 51.6 |
| 20B | .0185 | 0.69 | 2.1 | 709 | 38.3 |
| 21B | .0201 | 0.69 | 2.1 | 537 | 26.7 |
| 22B | .0212 | 0.69 | 2.1 | 813 | 38.3 |
| 23B | .0215 | 0.69 | 2.1 | 786 | 36.6 |

The polymerization results are given in Table VIII, runs 19B, 20B, and 21B, show that catalyst productivity appears to decline as the TiCl$_4$ treating temperature is increased from 23° C. to 80° C. at a constant mole ratio of MgCl$_2$ to TiCl$_4$ of about 0.9. This may be related to a visually observed agglomeration of the catalyst at the higher temperatures. Variation of the mole ratio of MgCl$_2$ to TiCl$_4$ from about 1 to about 4 at a treating temperature of 23° C. indicates in the results of runs 22B, 23B that the concentration of TiCl$_4$ is not critical. Catalyst B appears to gain about 5% in weight after the TiCl$_4$ treatment.

EXAMPLE V

Catalyst Preparation and Ethylene Polymerization

Several catalysts were prepared by individually ball milling a 10 g sample of ferrous chloride or a 10 g sample of manganous chloride with a specified amount of triethylorthoformate such that each catalyst had a 6.6 mole ratio of metal chloride to ester. The ball milling procedure, manner of TiCl$_4$ treatment of 23° C., and catalyst recovery were carried out as previously described. Portions of the catalysts were used in an attempt to polymerize ethylene in the manner described before.

The details of catalyst preparation are given in Table IX and the polymerization results are given in Table X.

TABLE X

Ethylene Polymerization At 80° C. No Hydrogen

| Run No. | Cat. B g | Pressures, MPa Ethylene | Total | Polymer g | Catalyst Productivity kg/g |
|---|---|---|---|---|---|
| 24B | 0.0187 | 0.69 | 2.1 | trace | not applicable |
| 25B | .0259 | 0.69 | 2.0 | 5 | 0.193 |

The polymerization results given in run 24B of Table X show that ferrous chloride cannot be substituted for MgCl$_2$ in preparing an active ethylene polymerization catalyst. When manganous chloride is used in place of MgCl$_2$ to prepare the catalyst the results given in run 25B indicate some polymerization activity for the catalyst but not enough to be of interest. Both runs clearly show that FeCl$_2$ and MnCl$_2$ are not equivalent to MgCl$_2$ in the preparation of active ethylene polymerization catalysts according to this invention.

What is claimed is:

1. A catalyst for the polymerization of monomers comprising ethylene comprising the product produced by
   (1) pretreating solid particles of magnesium dihalide by pulverizing said particles in the presence of at least one oxy compound of the formula

RR′C(OR″)$_2$ wherein R is selected from hydrogen, alkyl radicals having 1 to 4 carbon atoms, and halogenated alkyl radicals having 1 to 4 carbon atoms; wherein R′ is selected from hydrogen, alkyl radicals containing 1 to 4 carbon atoms, halogenated alkyl radicals containing 1 to 4 carbon atoms, and OR″; wherein each R″ is individually selected from alkyl radicals having 1 to 4 carbon atoms; and then
   (2) reacting said pretreated solid particles with a halogenated titanium compound of the formula TiX$_n$(OR‴)$_{4-n}$ wherein R‴ is a hydrocarbyl radical containing 1 to 12 carbon atoms, X is a halogen, and n is an integer of 1 to 4.

2. A catalyst according to claim 1 wherein each said oxy compound is selected from the group consisting of

TABLE IX

Catalyst Preparation, Replacement of MgCl$_2$ Component

| | Catalyst A | | | Catalyst B | | | | |
|---|---|---|---|---|---|---|---|---|
| Run No. | Metal Chloride g | Triethylorthoformate g | Mole Ratio Metal Chloride Ester | g | Catalyst A MgCl$_2$ g(a) | Hexane mL | TiCl$_4$ g | Mole Ratio Metal Chloride TiCl$_4$ |
| 24 | FeCl$_2$ (10) | 1.79 | 6.6 | 2.00 | 1.70 | 10 | 3.45 | 0.74 |
| 25 | MnCl$_2$ (10) | 2.68 | 6.6 | 2.00 | 1.58 | 10 | 3.45 | .69 |

(a)Calculated weight of metal chloride in 2 g of catalyst A.

trimethoxymethane; triethoxymethane; triisopropoxymethane; tri-n-butoxymethane; 1,1,1-trimethoxyethane; 1,1,1-trimethoxypropane; 1,1,1-triethoxybutane; 1,1,1-tri-n-butoxy-n-pentane; 1,1-diethoxy-2-chloroethane; 1,1-diethoxyethane; dimethoxymethane; 1,1-dimethoxyethane; diethoxymethane; 1,1-di-n-butoxyethane; di-n-butoxymethane; 2,2-diethoxypropane; 3,3-dipropoxy-n-pentane, and 2,2-dimethoxypropane.

3. A catalyst according to claim 1 wherein said magnesium dihalide is pretreated with at least one oxy compound of the formula

wherein R is selected from hydrogen and alkyl radicals having 1 to 4 carbon atoms and each R" is individually selected from alkyl radicals containing 1 to 4 carbon atoms.

4. A catalyst according to claim 3 wherein titanium tetrachloride is employed as at least part of the halogenated titanium compound.

5. A catalyst according to claim 4 wherein said magnesium halide consists essentially of magnesium dichloride.

6. A catalyst according to claim 5 wherein said oxy compound is selected from triethoxymethane, 1,1,1-triethoxypropane, 1,1,1-triethoxyethane, and trimethoxymethane.

7. A catalyst according to claim 6 wherein said halogenated titanium compound consists essentially of titanium tetrachloride and said oxy compound consists essentially of triethoxymethane.

8. A catalyst according to claim 7 wherein the molar ratio of said magnesium dichloride to said oxy compound is in the range of about 0.5/1 to about 100/1 and the mole ratio of titanium tetrachloride to magnesium dichloride is in the range of about 10/1 to 0.005/1.

9. A catalyst according to claim 8 wherein about 2 mL of said oxy compound is employed for every 10 grams of magnesium dichloride.

10. A catalyst according to claim 9 wherein said pulverization is conducted at atmospheric pressure and a temperature in the range of 25° C. to 75° C.

11. A catalyst according to claim 10 wherein said pretreated solid particles are reacted with said titanium tetrachloride at atmospheric pressure and a temperature in the range of about 20° C. to about 80° C.

12. A catalyst according to claim 1 wherein said oxy compound comprises at least one oxy compound selected from the defined oxy compounds other than ethyl orthoacetate and methyl orthoacetate.

13. A catalyst according to claim 5 wherein said oxy compound comprises triethoxymethane.

14. A polymerization catalyst system comprising a catalyst of claims 2, 11, or 12, 13 in combination with a cocatalyst comprising an organometallic compound of a metal of Groups I, IIA, and IIIA of the Periodic Table.

* * * * *

UNITED STATES PATENT AND TRADEMARK OFFICE
CERTIFICATE OF CORRECTION

PATENT NO. : 4,400,303

DATED : August 23, 1983

INVENTOR(S) : Joel L. Martin

It is certified that error appears in the above-identified patent and that said Letters Patent is hereby corrected as shown below:

Column 12, line 27, after "catalyst," delete

"of claims 2, 11, or 12, 13" and insert -- any of the preceding claims --.

Signed and Sealed this

Third Day of July 1984

[SEAL]

Attest:

GERALD J. MOSSINGHOFF

Attesting Officer

Commissioner of Patents and Trademarks

Disclaimer 4,400,303.—*Joel L. Martin*, Bartlesville, Okla. CATALYST FOR OLEFIN POLYMERIZATION. Patent dated Aug. 23, 1983. Disclaimer filed Jan. 26, 1984, by the assignee, *Phillips Petroleum Co.*

Hereby enters this disclaimer to claims 1, 2, 12 and 14 of said patent.

[*Official Gazette December 18, 1984.*]